US011616289B2

(12) United States Patent
Ahn et al.

(10) Patent No.: US 11,616,289 B2
(45) Date of Patent: Mar. 28, 2023

(54) ANTENNA FOR DETECTING POSITION OF EXTERNAL ELECTRONIC DEVICE AND WEARABLE ELECTRONIC DEVICE INCLUDING THE SAME

(71) Applicant: Samsung Electronics Co., Ltd., Gyeonggi-do (KR)

(72) Inventors: Jungho Ahn, Gyeonggi-do (KR); Kiyoung Kwon, Gyeonggi-do (KR); Boram Namgoong, Gyeonggi-do (KR)

(73) Assignee: Samsung Electronics Co., Ltd (*) Notice: Subject to any disclaimer, the term of this patent is extended or adjusted under 35 U.S.C. 154(b) by 263 days.

(21) Appl. No.: 16/248,019

(22) Filed: Jan. 15, 2019

(65) Prior Publication Data
US 2019/0221922 A1    Jul. 18, 2019

(30) Foreign Application Priority Data

Jan. 15, 2018 (KR) .......................... 10-2018-0004989

(51) Int. Cl.
H01Q 1/27 (2006.01)
H01Q 21/28 (2006.01)
(Continued)

(52) U.S. Cl.
CPC .............. *H01Q 1/273* (2013.01); *G01S 3/46* (2013.01); *G01S 3/48* (2013.01); *G04G 17/08* (2013.01);
(Continued)

(58) Field of Classification Search
CPC .......... G04G 17/08; G04G 21/04; H01Q 1/38; H01Q 5/30; G06F 1/163
See application file for complete search history.

(56) References Cited

U.S. PATENT DOCUMENTS 5,564,082 A * 10/1996 Blonder ................. G04G 21/04
343/718
5,742,256 A    4/1998 Wakabayashi
(Continued)

FOREIGN PATENT DOCUMENTS

CN    1716691    1/2006
CN    104243637    12/2014
(Continued)

OTHER PUBLICATIONS

International Search Report dated May 7, 2019 issued in counterpart application No. PCT/KR2019/000593, 8 pages.
(Continued)

*Primary Examiner* — Graham P Smith
(74) *Attorney, Agent, or Firm* — The Farrell Law Firm, P.C.

(57) ABSTRACT

An electronic device includes a housing including a front surface plate, a rear surface plate facing a direction opposite the front surface plate, and a side surface member surrounding a space between the front surface plate and the rear surface plate; at least one attachment member coupled to the side surface member, and removably fastened to a human body, the at least one attachment member including a first attachment member coupled to at least part of the side surface member, and a second attachment member coupled to a position of the side surface member facing the first attachment member; a substrate arranged in the space in parallel with the front surface plate; at least one wireless communication circuit arranged on the substrate; a first conductive pattern electrically connected with the wireless communication circuit, and arranged on the side surface member in proximity to the first attachment member; a second conductive pattern arranged on the side surface member in proximity to the second attachment member; a first conductive member arranged in the first attachment
(Continued)

member in proximity to the first conductive pattern to be capacitively coupled with the first conductive pattern; and a second conductive member arranged in the second attachment member in proximity to the second conductive pattern to be capacitively coupled with the second conductive pattern.

16 Claims, 14 Drawing Sheets

(51) Int. Cl.
    *G01S 3/46*     (2006.01)
    *G01S 3/48*     (2006.01)
    *H01Q 5/378*     (2015.01)
    *H01Q 5/25*     (2015.01)
    *H01Q 1/24*     (2006.01)
    *G04G 17/08*     (2006.01)
    *G04G 21/04*     (2013.01)
    *G06F 1/16*     (2006.01)
    *H01Q 1/38*     (2006.01)
    *H01Q 5/30*     (2015.01)
    *G06F 3/0488*     (2022.01)

(52) U.S. Cl.
    CPC ............. *G04G 21/04* (2013.01); *G06F 1/163* (2013.01); *H01Q 1/24* (2013.01); *H01Q 1/38* (2013.01); *H01Q 5/25* (2015.01); *H01Q 5/378* (2015.01); *H01Q 21/28* (2013.01); *G06F 3/0488* (2013.01); *H01Q 5/30* (2015.01)

(56) References Cited

U.S. PATENT DOCUMENTS

| | | | |
|---|---|---|---|
| 9,396,633 B1* | 7/2016 | Sannala | G08B 17/10 |
| 9,794,522 B2* | 10/2017 | Sannala | H04L 12/2814 |
| 9,836,900 B2* | 12/2017 | Jun | G07C 9/29 |
| 10,879,593 B2* | 12/2020 | Kim | H01Q 1/243 |
| 2003/0099161 A1 | 5/2003 | Bisig | |
| 2008/0165063 A1* | 7/2008 | Schlub | H01Q 21/30 |
| | | | 343/702 |
| 2011/0285830 A1* | 11/2011 | Kim | H04N 13/398 |
| | | | 348/56 |
| 2012/0264473 A1* | 10/2012 | Mujtaba | H04W 24/08 |
| | | | 455/515 |
| 2013/0227010 A1* | 8/2013 | Stirbu | H04M 1/72445 |
| | | | 709/204 |
| 2014/0187157 A1* | 7/2014 | Liao | H04B 1/385 |
| | | | 455/41.1 |
| 2014/0320357 A1 | 10/2014 | Chang | |
| 2014/0325371 A1 | 10/2014 | Wilson et al. | |
| 2016/0026156 A1 | 1/2016 | Jackson et al. | |
| 2016/0210615 A1* | 7/2016 | Lee | G06K 7/10356 |
| 2016/0322999 A1* | 11/2016 | Kim | H01Q 1/36 |
| 2017/0179580 A1* | 6/2017 | Park | H01Q 5/321 |
| 2017/0222692 A1* | 8/2017 | Huang | H04B 5/0081 |

FOREIGN PATENT DOCUMENTS

| | | |
|---|---|---|
| CN | 106842896 | 6/2017 |
| EP | 1 612 884 | 1/2006 |
| KR | 10-1180206 | 9/2012 |
| KR | 1020130110503 | 10/2013 |
| KR | 1020150045746 | 4/2015 |
| KR | 1020160131851 | 11/2016 |
| KR | 10-2017-0051015 | 5/2017 |
| KR | 10-2017-0074664 | 6/2017 |
| KR | 1020170074664 | 6/2017 |
| WO | WO 2017/051990 | 3/2017 |
| WO | WO 2017/105130 | 6/2017 |

OTHER PUBLICATIONS

European Search Report dated Jun. 3, 2019 issued in counterpart application No. 19151829.9-1205, 9 pages.
Chinese Office Action dated May 31, 2021 issued in counterpart application No. 201980008416.9, 20 pages.
Indian Examination Report dated Apr. 13, 2022 issued in counterpart application No. 202047027742, 6 pages.
Korean Office Action dated Nov. 18, 2022 issued in counterpart application No. 10-2018-0004989, 16 pages.

* cited by examiner

ANTENNA FOR DETECTING POSITION OF EXTERNAL ELECTRONIC DEVICE AND WEARABLE ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2018-0004989, filed on Jan. 15, 2018, in the Korean Intellectual Property Office, the disclosure of which is incorporated by reference herein in its entirety.

BACKGROUND

1. Field

The present disclosure relates generally to an antenna for detecting a position of an external electronic device and a wearable electronic device including the same.

2. Description of Related Art

With recent enhancements to semiconductor technology and wireless communication technology, networks which include communication functions can be easily controlled. A network of things having communication functions is referred to as the Internet of things (IoT). Recently, technology is improving in detecting a position of an IoT device (for example, an external electronic device), by using a portable electronic device. Additionally, the IoT device may easily be controlled.

However, IoT devices may be wearable devices (for example, watch-type electronic devices) which are becoming miniaturized to enhance portability, and it may be difficult to efficiently install multiple antennas spaced apart from each other by a predetermined distance to detect an external electronic device because mounting space may be limited.

SUMMARY

The present disclosure has been made to address the above-mentioned problems and disadvantages, and to provide at least the advantages described below.

In accordance with an aspect of the present disclosure, an electronic device includes a housing including a front surface plate, a rear surface plate facing a direction opposite the front surface plate, and a side surface member surrounding a space between the front surface plate and the rear surface plate; at least one attachment member coupled to the side surface member, and removably fastened to a human body, the at least one attachment member including a first attachment member coupled to at least part of the side surface member, and a second attachment member coupled to a position of the side surface member facing the first attachment member, a substrate arranged in the space in parallel with the front surface plate; at least one wireless communication circuit arranged on the substrate; a first conductive pattern electrically connected with the wireless communication circuit, and arranged on the side surface member in proximity to the first attachment member, a second conductive pattern electrically connected with the wireless communication circuit, and arranged on the side surface member in proximity to the second attachment member, a first conductive member arranged in the first attachment member in proximity to the first conductive pattern to be capacitively coupled with the first conductive pattern; and a second conductive member arranged in the second attachment member in proximity to the second conductive pattern to be capacitively coupled with the second conductive pattern.

In accordance with another aspect of the present disclosure, an electronic device includes a housing including a front surface plate, a rear surface plate facing a direction opposite the front surface plate, and a side surface member surrounding a space between the front surface plate and the rear surface plate; at least one attachment member coupled to the side surface member, and removably fastened to a human body, the at least one attachment member including a first attachment member coupled to at least part of the side surface member, and a second attachment member coupled to a position of the side surface member facing the first attachment member, a substrate arranged in the space in parallel with the front surface plate; at least one wireless communication circuit arranged on the substrate; a first conductive pattern electrically connected with the wireless communication circuit, and arranged in the first attachment member in proximity to the side surface member, and a second conductive pattern electrically connected with the wireless communication circuit, and arranged in the second attachment member in proximity to the side surface member.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
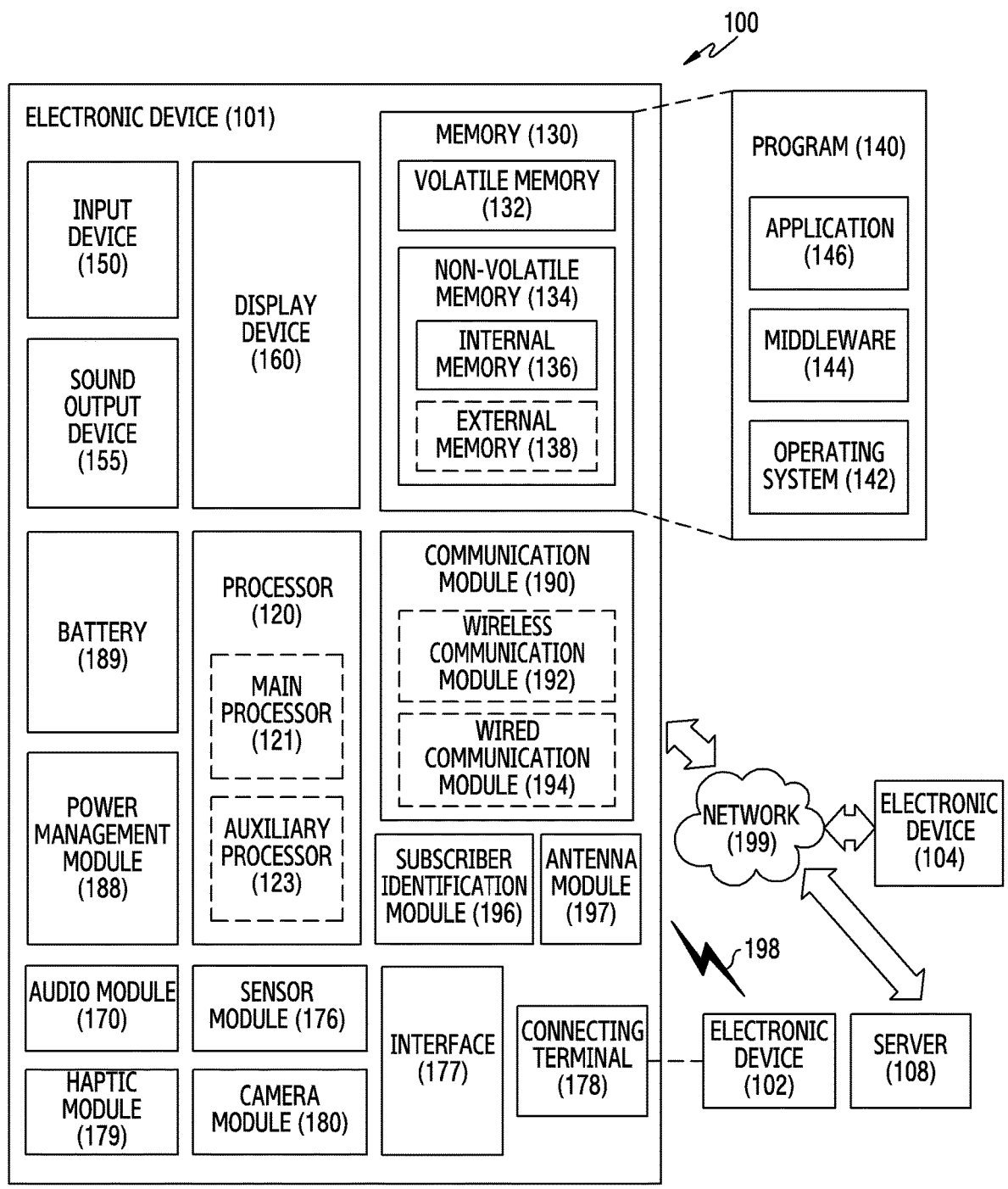
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram of an electronic device in a network environment, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
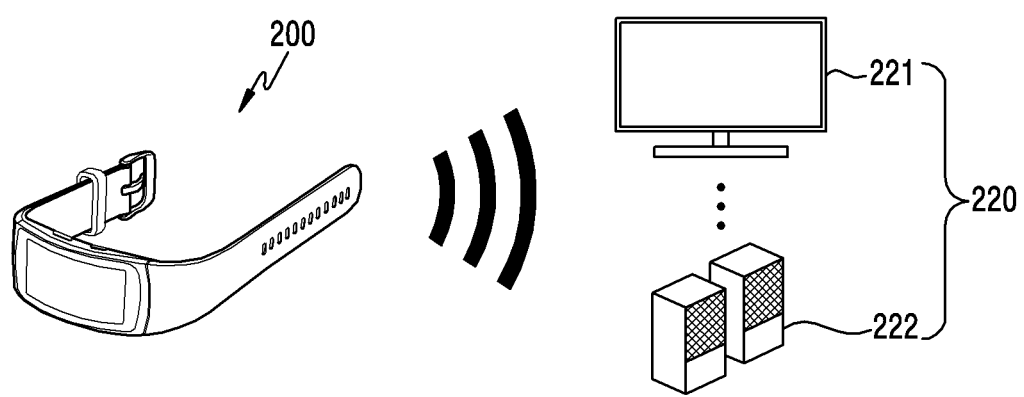
FIG. 2 is a view schematically illustrating a position detection system of an external electronic device, according to an embodiment.

FIG. 2 is a view schematically illustrating a position detection system of an external electronic device, according to an embodiment.

An electronic device 200 of FIG. 2 may be similar to at least part of the electronic device 101 of FIG. 1, or may include other embodiments of the electronic device.

Referring to FIG. 2, according to an embodiment, the electronic device 200 (e.g., the electronic device 101 of FIG. 1) may be connected with at least one external electronic device 220 via wireless communication. The at least one external electronic device 220 may be controlled through the electronic device 200, such that at least two electronic devices 221, 222 operate by interworking with each other. The external electronic device 220 may include, for example, a display device 221 outputting an image, and a speaker device 222 controlled to output a sound in association with the image outputted from the display device 221. The at least one external electronic device 220 may include various electronic devices which are able to transmit position information to the electronic device 200. The external electronic device 220 may include various large electronic devices such as automobiles and small ships, in addition to small electronic devices such as mobile phones, laptops, and computers.

According an embodiment, the electronic device 200 may detect a position of the at least one external electronic device 220 through an application program functionally connected thereto, and may provide a trigger point to perform connectivity with a specific external electronic device based on the detected position. The electronic device 200 may output the detected position of the external electronic device 200 in various ways. Outputting may include visually outputting (for example, displaying through a display) the position of the external electronic device 200, audibly outputting (for example, outputting through a speaker device), or tactually outputting (for example, outputting through a vibrator motor).

According to an embodiment, the electronic device 200 may include a wearable electronic device which is wearable on a human body. The wearable electronic device may include a watch type wearable electronic device which is wearable on a wrist. The electronic device 200 may detect the position of the external electronic device 200 (for example, a distance and/or an angle from the electronic device) by using signals received from the external electronic device via at least two antennas installed in the electronic device 200, and may output the detected position information. The electronic device 200 may be connected with an external electronic device to be able to control the same according to a request for connection with a specific external electronic device, among the at least one external electronic device 200, the position of which is detected. In the state where the electronic device 200 is connected and able to functionally control the specific external electronic device, the electronic device 200 may receive operation information and/or posture information of the electronic device through at least one sensor module (for example, a gyro sensor), and may control the corresponding external electronic device based on the received operation information and/or posture information. For example, the electronic device 200 may receive position information of a car (for example, a distance and/or an angle from the electronic device) in a parking lot, may be connected with a corresponding car to be able to control the car, and may control (for example, turn on or off the ignition) the car according to a control request.

Figure 3A:
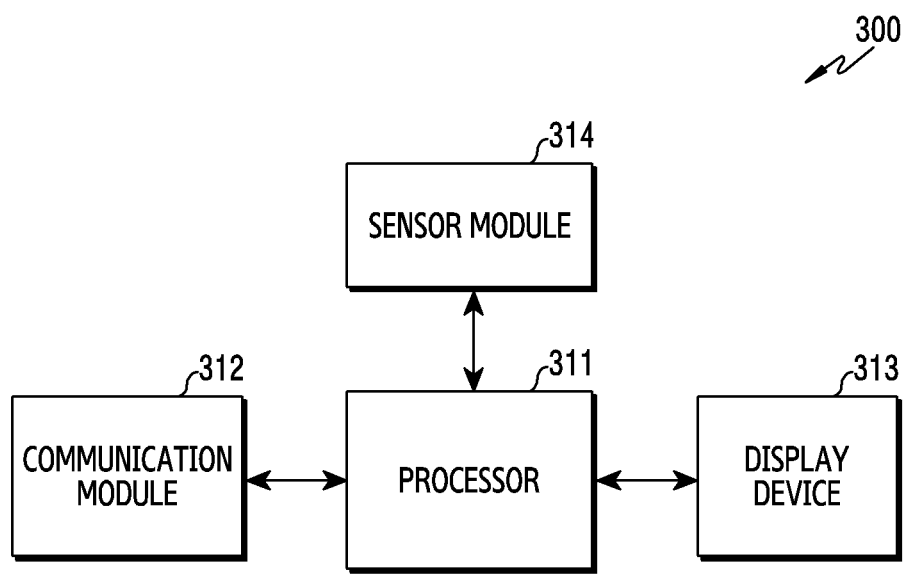
FIG. 3A is a block diagram of an electronic device, according to an embodiment.

FIG. 3A is a block diagram of an electronic device, according to an embodiment.

According to an embodiment, the electronic device 300 of FIG. 3A may be similar to at least part of the electronic device 101 of FIG. 1 or the electronic device 200 of FIG. 2, or may include other embodiments of the electronic device.

Referring to FIG. 3A, according to an embodiment, the electronic device 300 includes a processor 311 (e.g., the processor 120 of FIG. 1), a communication module 312 (e.g., the communication module 190 of FIG. 1), a display device 131 (e.g., the display device 160 of FIG. 1), and a sensor module 314 (e.g., the sensor module 176 of FIG. 1). The processor 311 may control an overall operation of the electronic device 300. The processor 311 may be operatively coupled with the communication module. 312, the display device 131, or the sensor module 314 to control the overall operation of the electronic device 300. The processor 311 may detect a position of an external electronic device (e.g., the external electronic device 220 of FIG. 2), based on a signal received from the external electronic device, which is provided from the communication module 312. The processor 311 may output the detected position information of the external electronic device through the display device 313. The processor 311 may receive operation information and/or posture information of the electronic device from the at least one sensor module 413, which is used as an input requesting means of the electronic device, in order to control the external electronic device functionally connected with the electronic device. According to various embodiments, the sensor module 314 may include a gyro sensor, an ultrasonic sensor, an optical sensor, or an acceleration sensor arranged to detect a motion of an external object, or to detect an operation and a posture of the electronic device.

According to an embodiment, the communication module 312 may transmit a signal, information, data, or a message received from at least one external electronic device to the processor 311, or may transmit a signal, information, data, or a message provided received from the processor 311 to the at least one external electronic device. The communication module 312 may receive a signal which is broadcasted from an external electronic device. The processor 311 may calculate a position of an external electronic device based on a signal provided from the communication module 312. According to an embodiment, the position may include a distance between the electronic device and the external electronic device, and an angle (direction) at which the external electronic device is located when viewed from the electronic device.

Figure 3B:
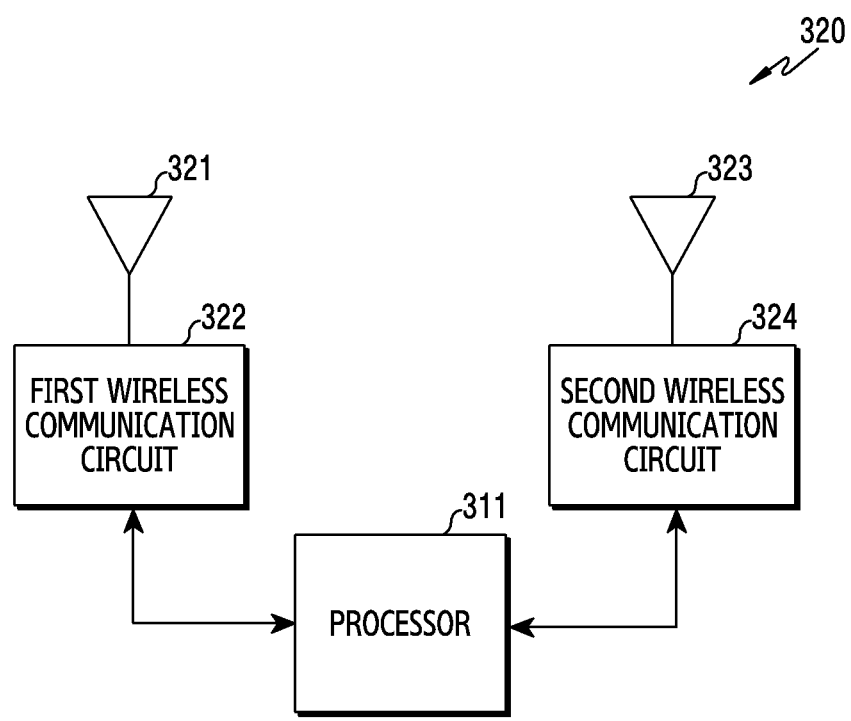
FIG. 3B is a view illustrating a configuration of a communication module of an electronic device, according to an embodiment.

FIG. 3B is a view illustrating a configuration of a communication module of an electronic device, according to an embodiment.

For example, a communication module 320 of FIG. 3B may be similar to at least part of the communication module 192 of FIG. 1 or the communication module 312 of FIG. 3A, or may include other embodiments of the communication module.

Referring to FIG. 3B, according to an embodiment, the communication module 320 may include a first wireless communication circuit 322 (for example, a first RFIC) connected with a first antenna 321, and a second wireless communication circuit 324 (for example, a second RFIC) connected with a second antenna 323. A first signal received from an external electronic device (e.g., the external electronic device 220 of FIG. 2) via the first antenna 321 may be provided to the processor 311 via the first wireless communication circuit 322. A second signal received from the external electronic device via the second antenna 323 may be provided to the processor 311 via the second wireless communication circuit 324. The first wireless communication circuit 322 and the second wireless communication circuit 324 may receive signals from the external electronic device in a frequency band (for example, ultrawide band (UWB)) ranging from about 3 gigahertz (GHz) to 10 GHz via the first antenna 321 and the second antenna 323. The processor 311 may detect a position of the external electronic device, based on the signals provided from the first wireless communication circuit 322 and the second wireless communication circuit 324. The processor 311 may obtain information regarding a phase difference between the first signal received from the external electronic device via the first antenna 321 and the first wireless communication circuit 322, and the second signal received via the second antenna 323 and the second wireless communication circuit 324. According to various embodiments, at least one of the received signals may include a strength of a signal between the antennas or a signal to noise ratio (SNR). The processor may detect the position of the external electronic device by using the information on the phase difference, and the strength of the signal between the antennas, or the SNR, as described above.

Figure 3C:
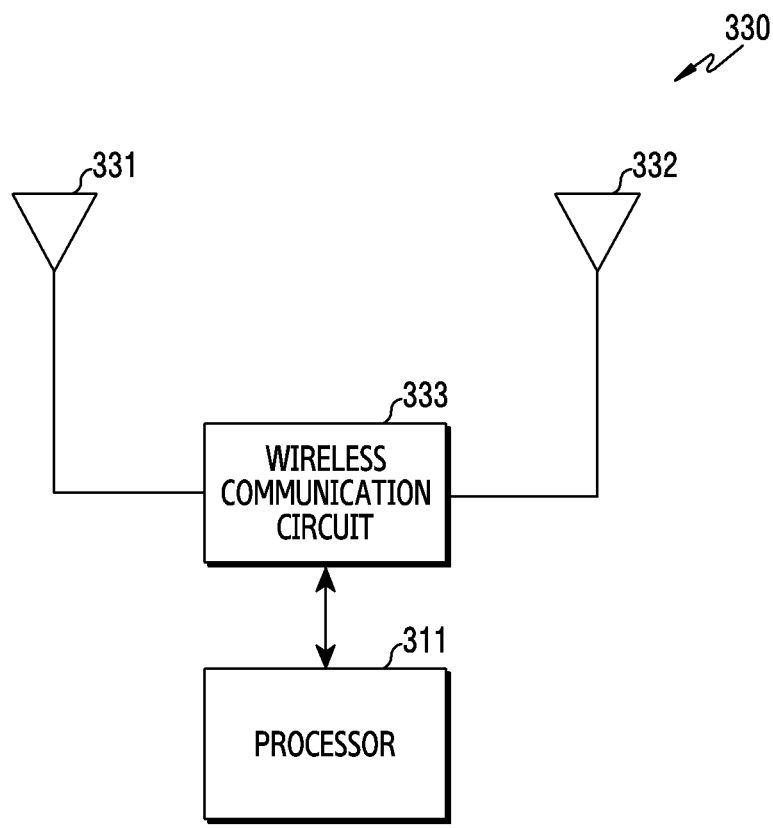
FIG. 3C is a view illustrating a configuration of a communication module of an electronic device, according to an embodiment.

FIG. 3C is a view illustrating a configuration of a communication module of an electronic device, according to an embodiment.

For example, a communication module of FIG. 3C may be similar to at least part of the communication module 192 of FIG. 1 or the communication module of FIG. 3A, or may include other embodiments of the communication module.

Referring to FIG. 3C, according to an embodiment, signals received from an external electronic device via two antennas 331, 332 may be provided to the processor 311 via one wireless communication circuit 333. In this case, the processor 311 may detect a position of the external electronic device based on the signals received from the wireless communication circuit 333.

Figure 4:
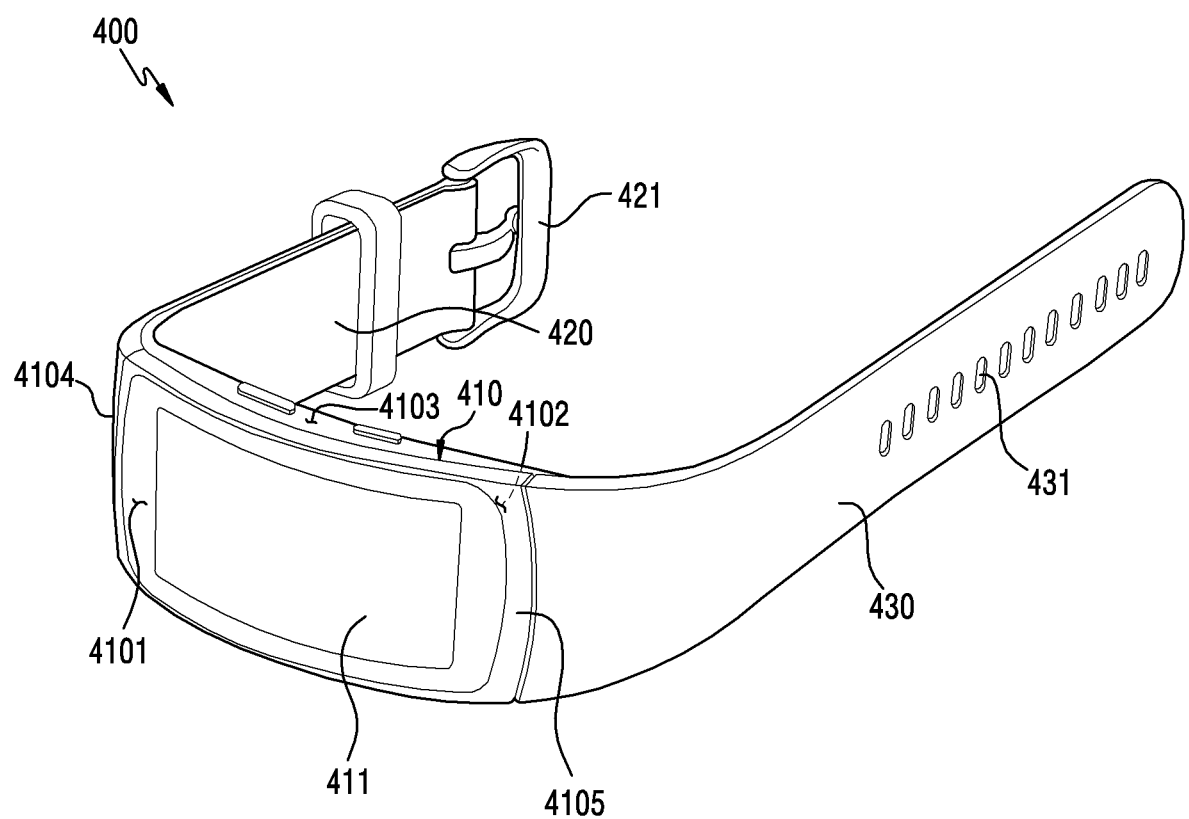
FIG. 4 is a perspective view illustrating an electronic device, according to an embodiment.

FIG. 4 is a perspective view illustrating an electronic device, according to an embodiment.

For example, the electronic device 400 of FIG. 4 may be similar to at least part of the electronic device 101 of FIG. 1, the electronic device 200 of FIG. 2, or the electronic device 300 of FIG. 3A, or may include other embodiments of the electronic device.

Referring to FIG. 4, according to an embodiment, the electronic device 400 may include a wearable electronic device which is worn on a user's wrist. The electronic device 400 may include a housing 410 (for example, a main body). The housing 410 may include a front surface plate 4101, a rear surface plate 4102 facing in a direction opposite the front surface plate 4101, and a side surface member 4103 surrounding a space between the front surface plate 4101 and the rear surface plate 4102. The housing 410 may be formed of a conductive member (for example, metal) or a nonconductive member (for example, a nonconductive material such as polyurethane (PC), rubber, or urethane). According to various embodiments, the housing 410 may be formed by inserting a nonconductive member into at least part of a conductive member by insert injection molding, or by inserting a conductive member into at least part of a nonconductive member by insert injection molding. The electronic device 400 may include a display 411 which is arranged to be exposed through at least part of the front surface plate 4101 of the housing 410. The display 411 may include a touch screen display. The display 411 may include a pressure-reactive type touch screen display which reacts to a pressure.

According to an embodiment, the electronic device 400 may include a first coupling portion 4104 arranged at one side of the housing 410 and a second coupling portion 4105 arranged at the other side opposite the one side. The electronic device 400 may include a pair of attachment members 420, 430 (for example, connection portions and straps) having predetermined lengths and pivotably coupled to the first coupling portion 4104 and the second coupling portion 4105, respectively. A buckle member 421 may be arranged at an end of the first attachment member 420 that is arranged at one end of the housing 410, and a plurality of openings 431 may be arranged on the second attachment member 430 that is arranged at the other end at regular intervals, and may be coupled with the buckle member 421. The electronic device 400 may be worn by placing the housing 410 on the user's wrist, winding the wrist with the first attachment member 420 and the second attachment member 430, and using the buckle member 421 and the openings 431. However, other well-known fastening structures for mutually fastening the pair of attachment members 420, 430 may be applied.

According to an embodiment, the electronic device 400 may include at least two antennas 321, 323 of FIG. 3B to receive wireless signals relayed from a surrounding external electronic device 220 of FIG. 2. The at least two antennas 321, 323 may be electrically connected with at least one wireless communication circuit 322 or 324 of FIG. 3B arranged in the housing 410. The at least one wireless communication circuit 322 or 324 may be for detecting a position. The electronic device 400 may detect a position of the external electronic device based on the signals received from the above-described two antennas via the wireless communication circuit. The electronic device 400 may display the position information of the external electronic device detected through the display 411.

According to an embodiment, the electronic device 400 may include at least one other antenna in addition to the above-described at least two antennas. The above-described two antennas may operate in a UWB (for example, about 3 GHz to 10 GHz), and the at least one other antenna may operate in a low band, a mid band and/or a high band.

Figure 5A:
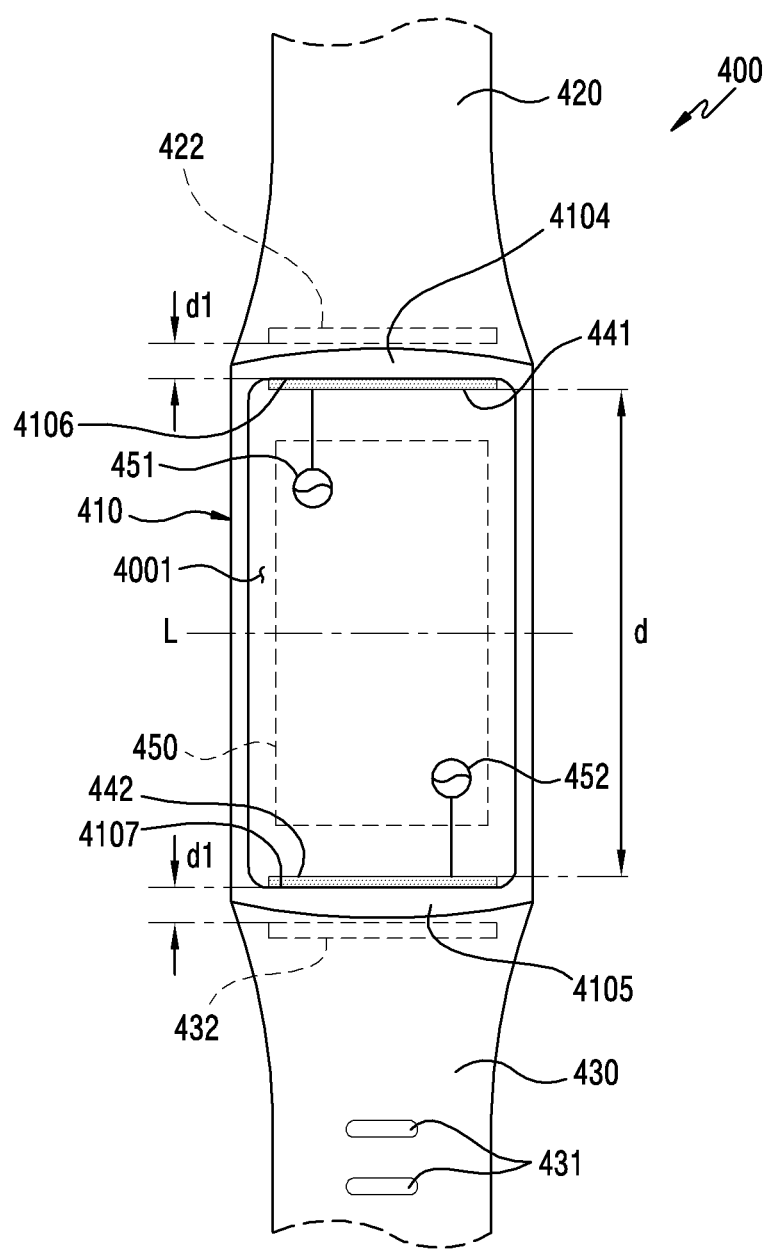
FIG. 5A is a view illustrating an arrangement of an antenna in an electronic device, according to an embodiment.

FIG. 5A is a view illustrating an arrangement of an antenna in an electronic device, according to an embodiment.

For example, the electronic device 400 of FIG. 5A may be similar to at least part of the electronic device 101 of FIG. 1, the electronic device 200 of FIG. 2, or the electronic device 300 of FIG. 3A, or may include other embodiments of the electronic device.

Referring to FIG. 5A, according to an embodiment, the electronic device 400 may include a housing 410, a first attachment member 420 coupled to a first coupling portion 4104 of the housing 410, and a second attachment member 430 coupled to a second coupling portion 4105 of the housing 410. The electronic device 400 may include a substrate 450 mounted in an inner space of the housing 410. The electronic device 400 may include at least one wireless communication circuit 451, 452 mounted on at least part of the substrate 450. The electronic device 400 may include a pair of conductive patterns 441, 442 arranged in an inner space 4001. The first conductive pattern 441 may be arranged on an inner surface 4106 of the housing 410 in proximity to the first coupling portion 4104, and the second conductive pattern 442 may be arranged on an inner surface 4107 of the housing 410 in proximity to the second coupling portion 4105.

According to an embodiment, the first conductive pattern 441 may be electrically connected with the first wireless communication circuit 451 mounted on the substrate 450, and the second conductive pattern 442 may be electrically connected with the second wireless communication circuit 452 mounted on the substrate 450. The first wireless communication circuit 451 may receive a wireless signal relayed from an external electronic device (e.g., the external electronic device 220 of FIG. 2) via the first conductive pattern 4106, and may provide the wireless signal to a processor (e.g., the processor 311 of FIG. 3) of the electronic device 400. The second wireless communication circuit 452 may receive a wireless signal relayed from the external electronic device via the second conductive pattern 442, and may provide the wireless signal to the processor of the electronic device. According to various embodiments, the pair of conductive patterns 441, 442 may be electrically connected to a single wireless communication circuit (e.g., the wireless communication circuit 333 of FIG. 3C). Additionally, the conductive patterns 441, 442 may be attached or formed in the form of a laser direct structuring (LDS), a thin film antenna (TFA), a flexible printed circuit board (FPCB), or a steel use stainless (SUS) arranged on the inner surfaces 4106, 4107 of the side surface member 4103 of FIG. 4 of the housing 410.

According to an embodiment, a first conductive member 422 may be arranged in at least part of the first attachment member 420 at a distance dl to be capacitively coupled with the first conductive pattern 441 when the first attachment member 420 is coupled to the first coupling portion 4104 of the housing 410. The second conductive member 432 may be arranged at a distance dl to be capacitively coupled with the second conductive pattern 442 when the second attachment member 430 is coupled to the second coupling portion 4105 of the housing 410. In this case, a region of the housing and/or the attachment member between each of the conductive members 422, 432 and each of the conductive patterns 441, 442 may be formed of a nonconductive material.

According to an embodiment, each of the conductive members 422, 432 may expand a bandwidth of each of the conductive patterns 441, 442, and may increase radiation efficiency. The radiation performance of each of the conductive patterns 441, 442 may be determined based on a coupling area and a coupling distance of the conductive member 422, 432, which is arranged to be capacitively coupled with the conductive pattern 441, 442.

According to an embodiment, the conductive members 422, 432 may include metal flanges arranged in the attachment members 420, 430 for the purpose of reinforcing rigidity. The conductive members 422, 432 may be arranged in such a manner that the conductive members 422, 432 are not exposed to the outside when the attachment members 420, 430 are coupled to the housing 410.

According to an embodiment, when the attachment members 420, 430 are formed of a nonconductive member (for example, rubber, urethane, or PC), the conductive members 422, 432 may be formed by inserting at least a part thereof into the attachment members 420, 430 by insert injection molding.

According to various embodiments, the conductive members 422, 432 may be arranged on corresponding locations of the attachment members 420, 430, and may be exposed to the outside. In this case, the conductive members 422, 432 may include a metal decoration member which is exposed to the outside of the electronic device 400.

According to an embodiment, the conductive members 422, 432 may include at least part of a conductive coupling means for coupling the attachment members 420, 420 to the housing 410. The conductive coupling means may include a conductive shaft, a conductive pin, a conductive connector, or a conductive screw.

According to an embodiment, the pair of conductive patterns 441, 442 may operate at the same frequency to receive signals from an external electronic device. Accordingly, the pair of conductive patterns 441, 442 may have the same shape. The pair of conductive patterns 441, 442 may be arranged at locations symmetric to each other with reference to a virtual center line L of the housing 410 of the electronic device 400. According to an embodiment, the pair of conductive patterns 441, 442 may be spaced from each other by an electric distance d to prevent mutual interference. The spacing distance d may be longer than or equal to about 2.

Figure 5B:
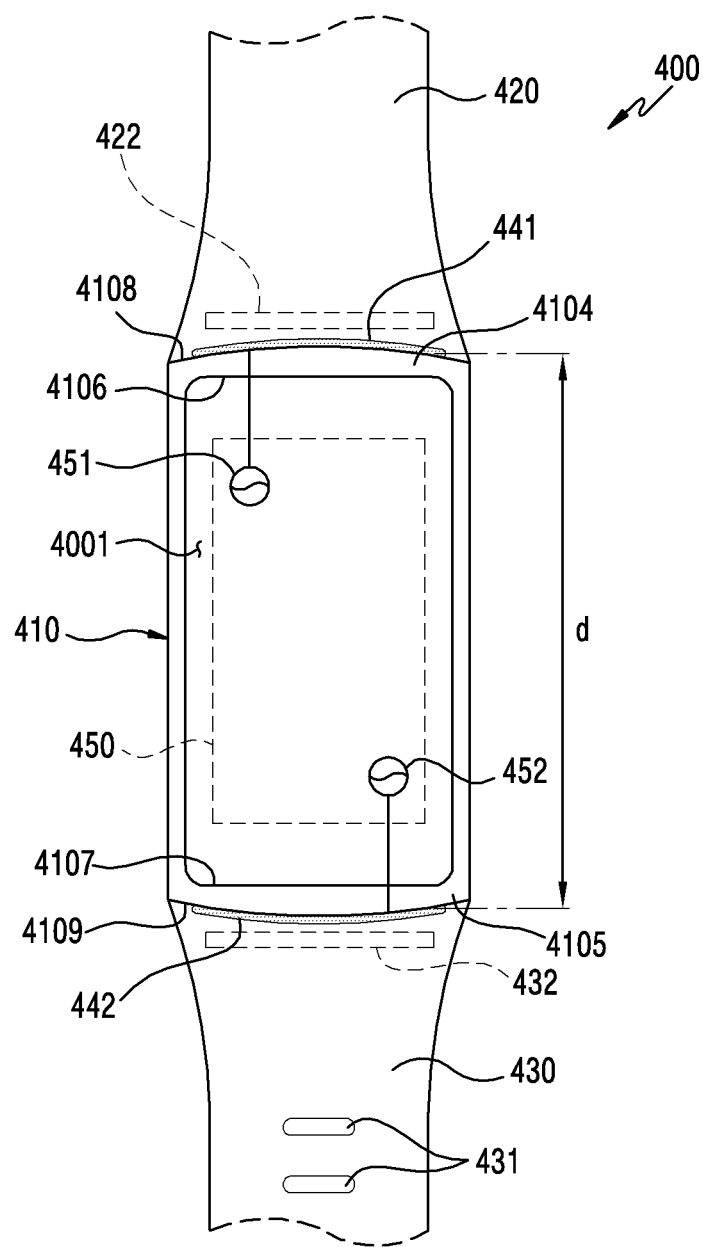
FIG. 5B is a view illustrating an arrangement of an antenna in an electronic device, according to an embodiment.

FIG. 5B is a view illustrating an arrangement of an antenna in an electronic device, according to an embodiment.

Referring to FIG. 5B, according to an embodiment, the conductive patterns 441, 442 may be arranged on outer surfaces 4108, 4109 of the housing 410 of the electronic device 400, rather than on the inner surfaces of the housing 410. The first conductive pattern 441 may be arranged on the outer surface 4108 of the housing 410 adjacent to the first coupling portion 4104, and the second conductive pattern 442 may be arranged on the outer surface 4109 of the housing 410 adjacent to the second coupling portion 4105.

According an embodiment, arrangement locations of the conductive members 422, 432 arranged in the attachment members 420, 430 may be determined such that the conductive members 422, 432 are arranged at appropriate distances to be capacitively coupled with the conductive patterns. In this case, the conductive patterns 441, 442 are arranged on the outer surfaces 4108, 4109 of the housing 410, such that interference between electronic components arranged in the housing 410 can be minimized, and radiation performance and a degree of freedom for mounting various components can be enhanced.

Figure 5C:
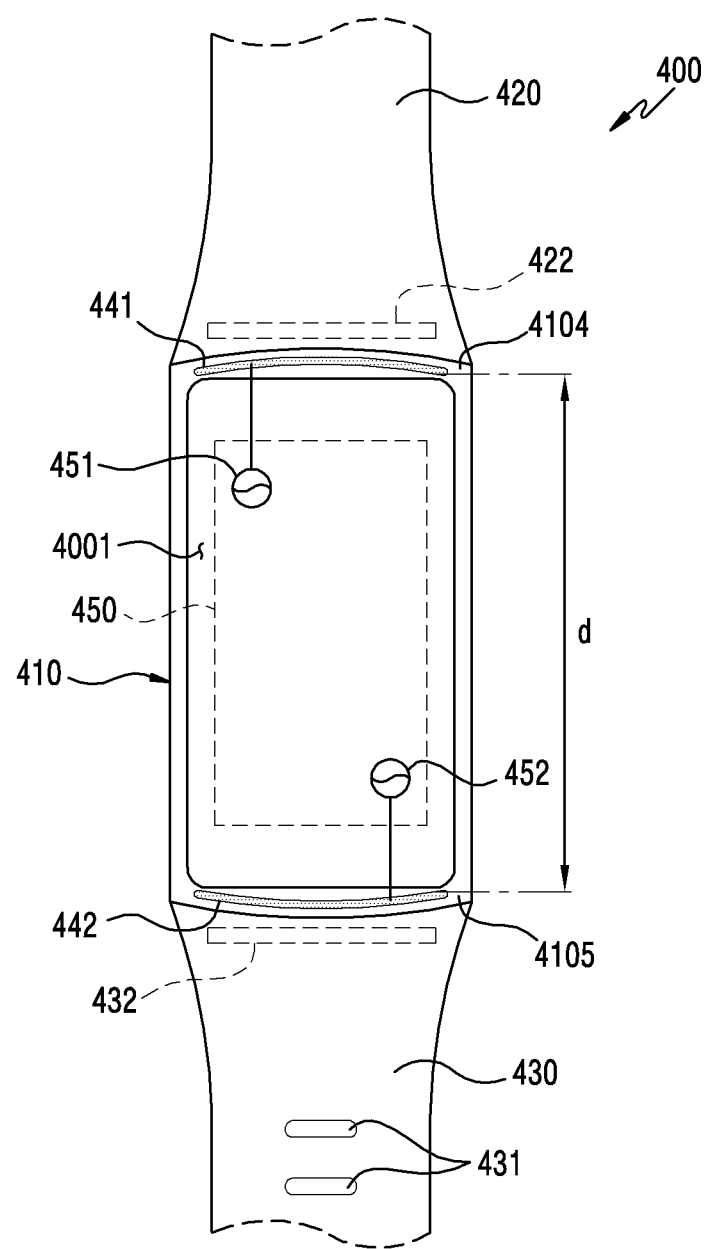
FIG. 5C is a view illustrating an arrangement of an antenna in an electronic device, according to an embodiment.

FIG. 5C is a view illustrating an arrangement of an antenna in an electronic device, according to an embodiment.

Referring to FIG. 5C, according to an embodiment, the conductive patterns 441, 442 may be formed by inserting at least a part thereof into the housing 410 by insert injection molding when the housing 410 is fabricated. In this case, the first coupling portion 4104 and the second coupling portion 4105 of the housing 410 may be formed of a nonconductive material. The first conductive pattern 441 may be insert injection molded and arranged inside an area of the housing 410 corresponding to the first coupling portion 4104. The second conductive pattern 442 may be insert injection molded and arranged inside an area of the housing 410 corresponding to the second coupling portion 4105. In this case, interference between electronic components arranged inside the housing 410 can be minimized and thus a degree of freedom for mounting various components can be enhanced.

Figure 5D:
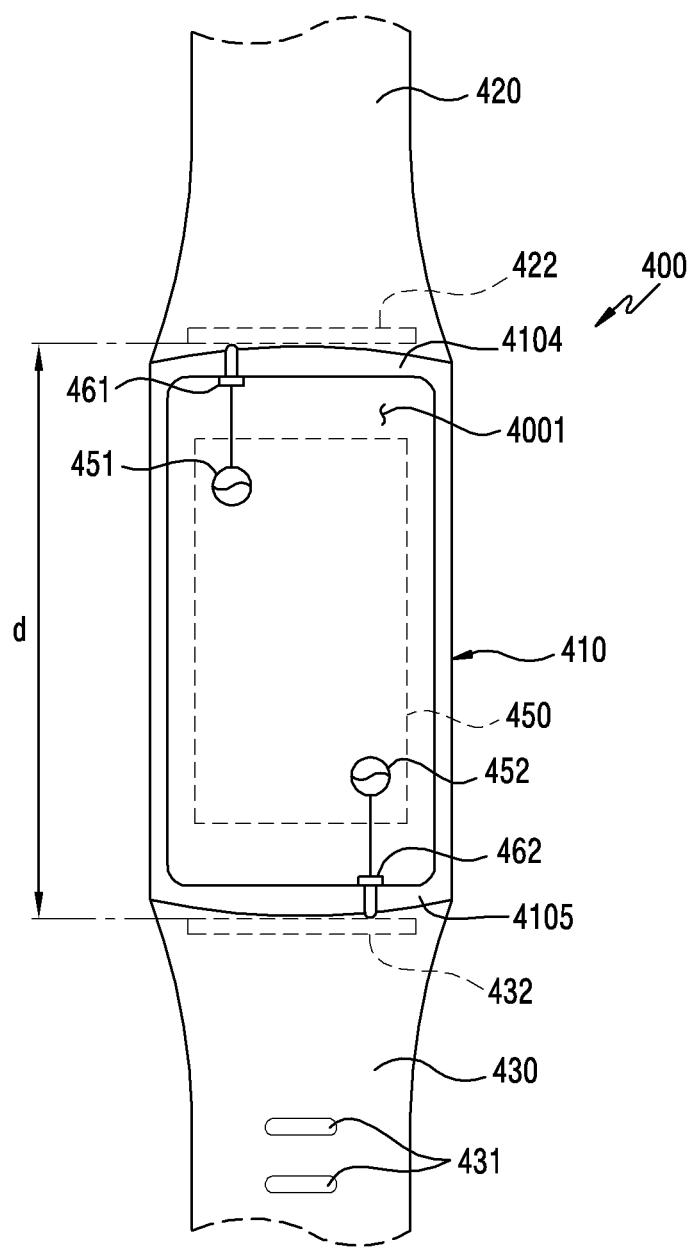
FIG. 5D is a view illustrating an arrangement of an antenna in an electronic device, according to an embodiment.

FIG. 5D is a view illustrating an arrangement of an antenna in an electronic device, according to an embodiment.

Referring to FIG. 5D, according to an embodiment, the electronic device 400 may be include conductive members 422, 432 arranged in the attachment members 420, 430 so that the conductive members 422, 432 may be electrically connected to the wireless communication circuits 451, 452, respectively, and may operate as antenna radiators. In this case, the electronic device 400 may further include electric connection devices 461, 462 protruding from the inner space 4001 toward the attachment members. The electric connection devices 461, 462 may be electrically connected with the wireless communication circuits 451, 452, and may include an elastic conductive member or a flexible conductive member, such as a pogo fin, a ball plunger, or a spring, protruding from a side surface member 4103 of FIG. 4 of the housing 410 toward the attachment members 420, 430. According to various embodiments, the electronic device 400 may omit the conductive patterns 441, 442 arranged inside the housing 410 or on the outer surfaces of the housing 410, such that a degree of freedom for mounting other components can be enhanced.

Figure 6:
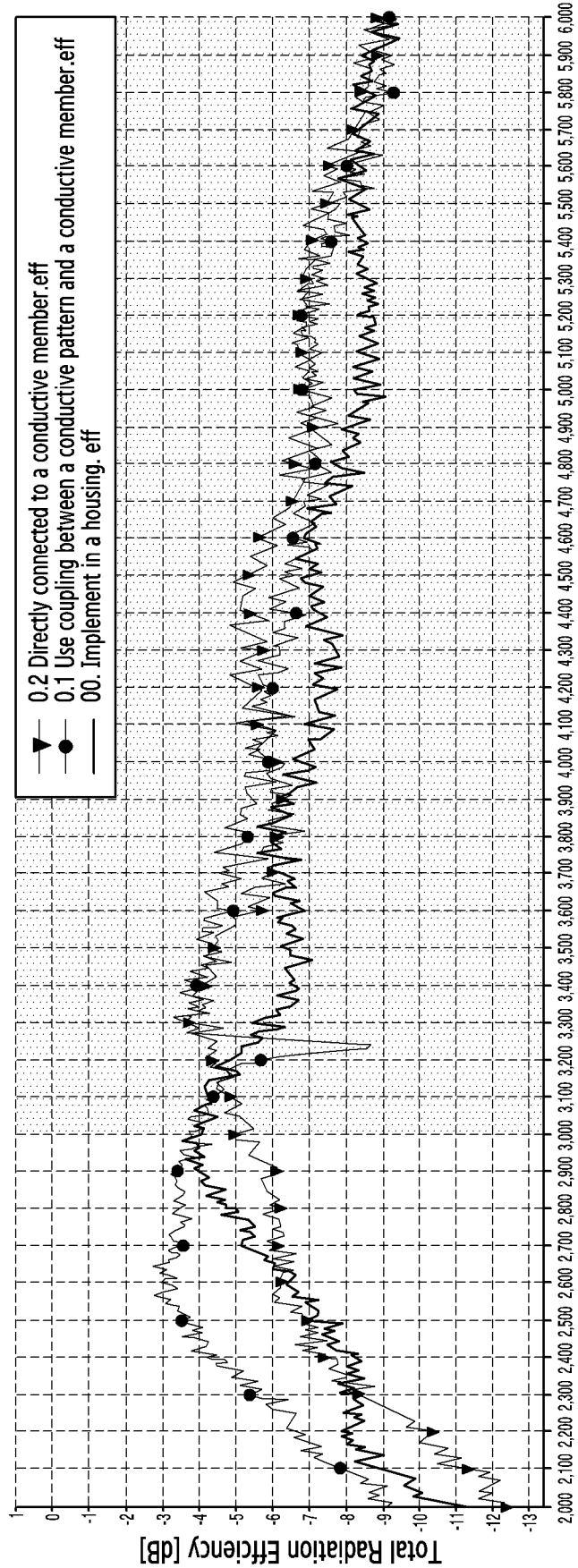
FIG. 6 is a graph comparing efficiencies of an electronic device, according to an embodiment.

FIG. 6 is a graph comparing efficiencies of an electronic device, according to an embodiment.

Referring to FIG. 6, according to an embodiment, an antenna configuration in which a conductive pattern, such as one of the conductive patterns 441, 442 of FIG. 5A, and a conductive member, such as one of the conductive members 422, 432 of FIG. 5A, are coupled to each other produces the highest radiation efficiency in a UWB frequency band (for example, 3 GHz or higher). Furthermore, it can be seen that when a conductive member, such as one of the conductive members 422, 432 of FIG. 5C, are arranged in an attachment member, such as one of the attachment members 420, 430 of FIG. 5C, is used as an antenna radiator, a higher radiation efficiency is achieved than when a conductive pattern is only arranged inside the housing 410.

Figure 7:
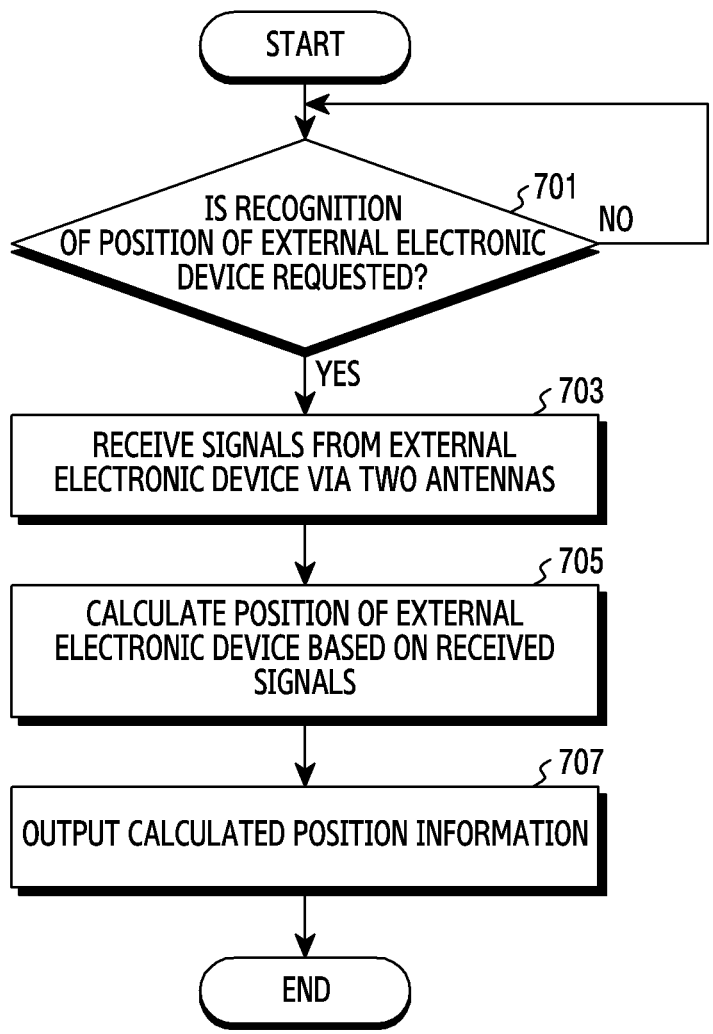
FIG. 7 is a flowchart illustrating a procedure for detecting a position of an external electronic device, according to an embodiment.

FIG. 7 is a flowchart illustrating a procedure for detecting a position of an external electronic device, according to an embodiment.

Referring to FIG. 7, according to an embodiment, the electronic device may determine if recognizing a position of an external electronic device (e.g., an electronic device 81 of FIG. 8) is requested in step 701. The electronic device may detect the position of the external electronic device according to an input request performed through a touch display (e.g., the display 411 of FIG. 4). Additionally or alternatively, the electronic device may be set to automatically detect the position of the external electronic device when the electronic device is located at a position where signals are relayed from the external electronic device, within a reception distance for receiving a relevant signal.

According to an embodiment, in step 703, the electronic device may receive signals relayed from the external electronic device via two antennas (e.g., a first antenna A1 and a second antenna A2 of FIG. 8) according to the position recognition request. The electronic device may receive the signals from the external electronic device via the antennas via a wireless communication circuit.

According to an embodiment, in step 705, the electronic device may calculate a position of the external electronic device based on the signals received from the external electronic device.

Figure 8:
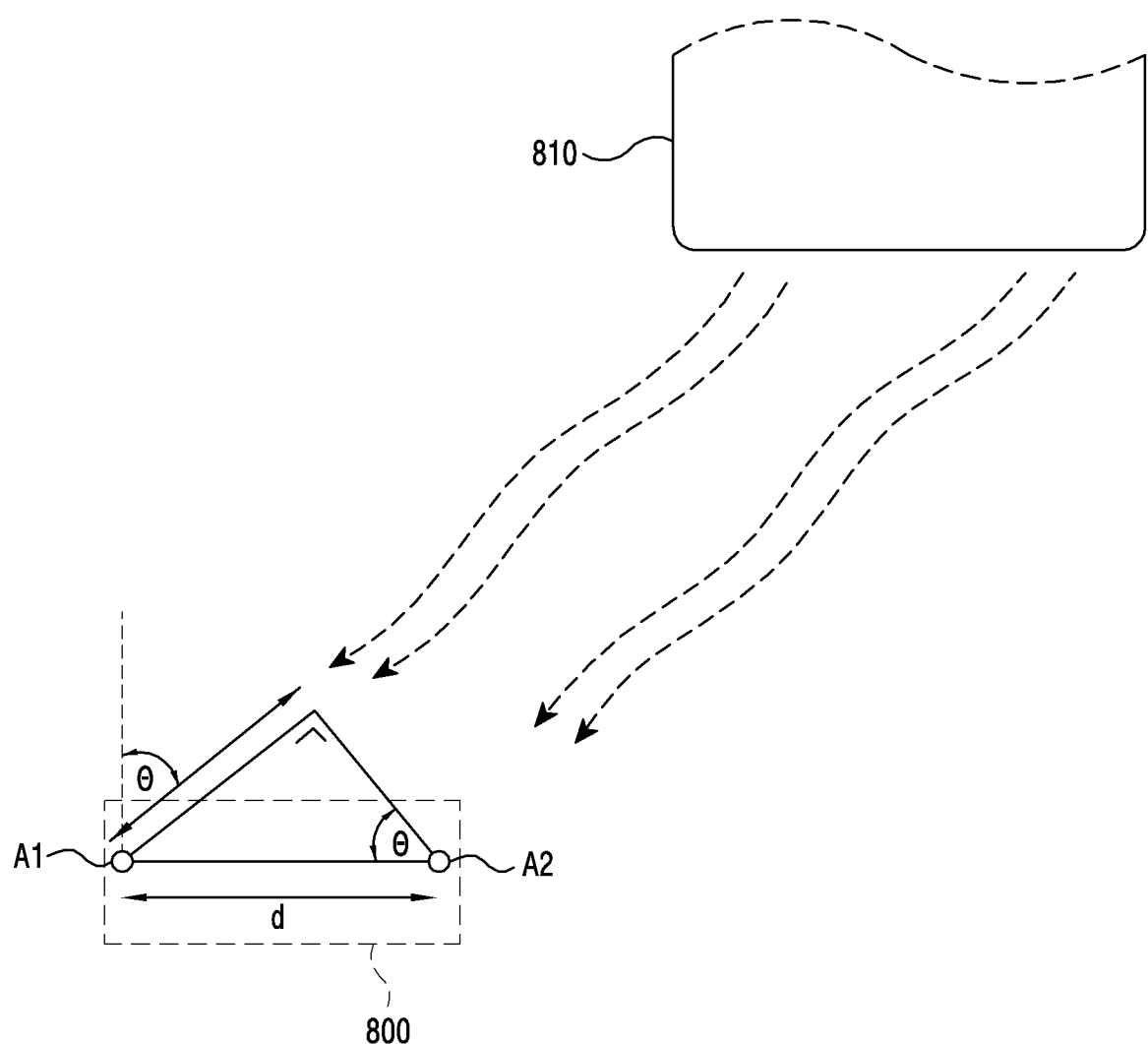
FIG. 8 is a mimetic diagram corresponding to an equation for calculating a position between an electronic device and an external electronic device, according to an embodiment.

For example, referring to FIG. 8, which is a mimetic diagram corresponding to an equation for calculating a position between an electronic device and an external electronic device, according to an embodiment, the electronic device 800 may use a phase difference between the signal received from the first antenna A1 (e.g., the first conductive pattern 441 of FIG. 5A) and the signal received from the second antenna A2 (e.g., the second conductive pattern 442 of FIG. 5A), and may calculate an angle (for example, a direction) of the external electronic device distanced from the electronic device by using Equation (1) presented below:

$$\theta = \sin^{-1} \frac{\alpha \lambda}{2\pi d} \quad (1)$$

α is a phase difference between signals received from two antennas A1, A2; d is a distance between the two antennas A1, A2; and λ is a wavelength.

Referring back to FIG. 7, according to an embodiment, in step 707, the electronic device may output calculated information related to the position of the external electronic device.

Figure 9:
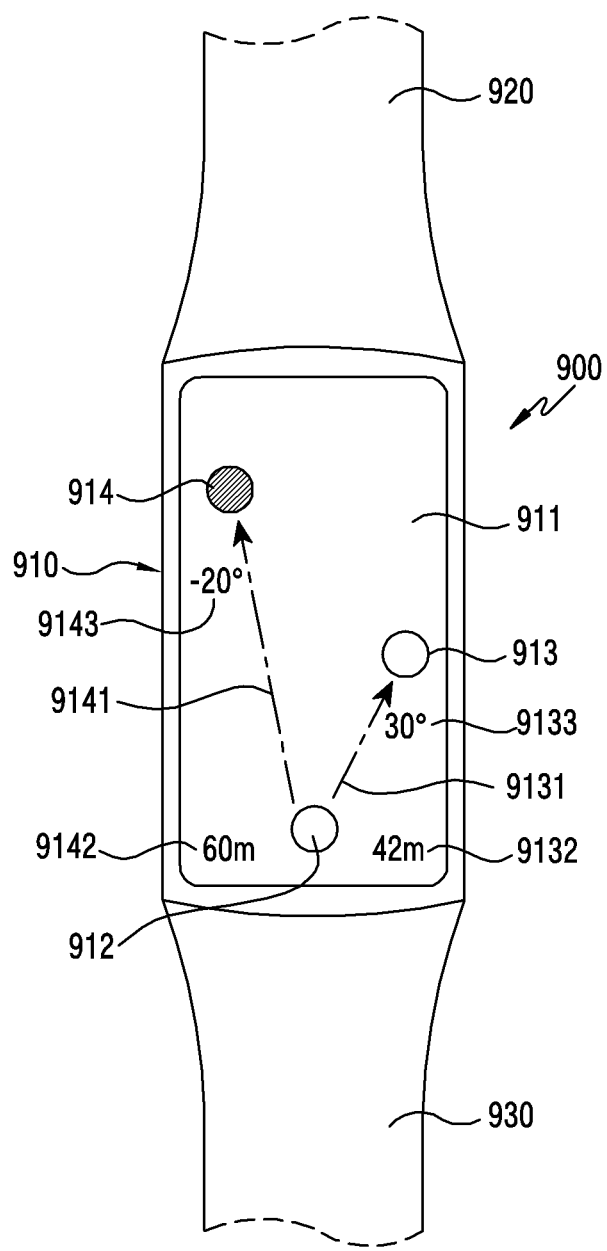
FIG. 9 is a view illustrating an electronic device displaying a position of an external electronic device, according to an embodiment.

FIG. 9 is a view illustrating an electronic device displaying a position of an external electronic device, according to an embodiment.

Referring to FIG. 9, according to an embodiment, the electronic device 900 may include a housing 910 including a display 911, and a pair of attachment members 920, 930 attached to regions of the housing 901 corresponding to each other. The electronic device 900 may control the display 911 disposed in the housing 910 to display a position relationship between the electronic device 900 and at least one external electronic device (e.g., the external electronic device 810 of FIG. 8). The electronic device 900 may display a first object 912 corresponding to the electronic device 900 through the display 911, and may display at least one object 913, 914 corresponding to at least one external electronic device. The electronic device may display position information (i.e., an angle or distance) between the electronic device 900 and the external electronic device through the display 911. The position information may display arrow objects 9131, 9141 directed from the object 912 corresponding to the electronic device toward the at least one object 913, 914 corresponding to angle objects 9133, 9143 indicating angles, or distance objects 9132, 9142 indicating distances.

As shown in FIG. 9, for example, the electronic device 900 may display, through the display 911, information indicating that a first external electronic device is located at a distance of 42 m from the electronic device 900 in a direction of 30 degrees with respect to a current position (i.e., direction). Additionally, the electronic device 900 displays, through the display 911, information indicating that a second external electronic device is located at a distance of 60 m from the electronic device 900 in a direction of −20 degrees with respect to a current position (i.e., direction).

According to an embodiment, an electronic device (e.g., the electronic device 400 of FIG. 4) may include a housing (e.g., the housing 410 of FIG. 4) including a front surface plate (e.g., the front surface plate 4101 of FIG. 4), a rear surface plate (e.g., the rear surface plate 4102 of FIG. 4) facing a direction opposite the front surface plate, and a side surface member (e.g., the side surface member 4103 of FIG. 4) surrounding a space between the front surface plate and the rear surface plate; at least one attachment member coupled to the side surface member, and removably fastened to a human body, the at least one attachment member including a first attachment member (e.g., the first attachment member 420 of FIG. 4) coupled to at least part of the side surface member, and a second attachment member (e.g., the second attachment member 430 of FIG. 4) coupled to a position of the side surface member facing the first attachment member, a substrate (e.g., the substrate 450 of FIG. 5A) arranged in the space in parallel with the front surface plate; at least one wireless communication circuit (e.g., the wireless communication circuits 451, 452 of FIG. 5A) arranged on the substrate; a first conductive pattern (e.g., the first conductive pattern 441 of FIG. 5A) electrically connected with the wireless communication circuit, and arranged on the side surface member in proximity to the first attachment member; a second conductive pattern (e.g., the second conductive pattern 442 of FIG. 5A) arranged on the side surface member in proximity to the second attachment member, a first conductive member (e.g., the first conductive member 422 of FIG. 5A) arranged in the first attachment member in proximity to the first conductive pattern to be capacitively coupled with the first conductive pattern; and a second conductive member (e.g., the second conductive member 432 of FIG. 5A) arranged in the second attachment member in proximity to the second conductive pattern to be capacitively coupled with the second conductive pattern.

According to various embodiments, the wireless communication circuit may receive signals of a same frequency band via the first conductive pattern and the second conductive pattern.

According to various embodiments, the first conductive pattern and the second conductive pattern may be formed in a same shape.

According to various embodiments, the first conductive pattern and the second conductive pattern may be spaced apart from each other to have an electric length of 2/λ or longer.

According to various embodiments, the first conductive pattern and the second conductive pattern may be arranged on inner surfaces of the side surface member in the space.

According to various embodiments, the first conductive pattern and the second conductive pattern may be arranged on outer surfaces of the side surface member.

According to various embodiments, the first conductive pattern and the second conductive pattern may be formed by inserting at least part thereof into the side surface member by insert injection molding.

According to various embodiments, the first conductive pattern and the second conductive pattern may be attached or formed in the form of an LDS, a TFA, an FPCB, or an SUS arranged on the side surface member of the housing.

According to various embodiments, the wireless communication circuit may receive signals of a frequency band ranging from 3 GHz to 10 GHz via the first conductive pattern and the second conductive pattern.

According to various embodiments, the first conductive member and the second conductive member may include metal flanges arranged in the first attachment member and the second attachment member, respectively.

According to various embodiments, the first conductive member and the second conductive member may be arranged to avoid being visually exposed when the first attachment member and the second attachment member are coupled to the housing.

According to various embodiments, the electronic device may further include a display; and a processor operatively connected with the display, and the processor may be configured to calculate a position of at least one external electronic device, based on signals received from wireless communication via the first conductive pattern and the second conductive pattern.

According to various embodiments, the processor may be configured to output information related to the calculated position through the display.

According to various embodiments, the information related to the calculated position may include angle information, direction information, or distance information from the electronic device toward the external electronic device.

According to various embodiments, the electronic device may include a wearable electronic device, which is wearable on a human body.

According to an embodiment, an electronic device may include a housing including a front surface plate, a rear surface plate facing in a direction opposite the front surface plate, and a side surface member surrounding a space between the front surface plate and the rear surface plate; at least one attachment member coupled to the side surface member, and removably fastened to a human body, the at least one attachment member including a first attachment member coupled to at least part of the side surface member, and a second attachment member coupled to a position of the side surface member facing the first attachment member, a substrate arranged in the space in parallel with the front surface plate; at least one wireless communication circuit arranged on the substrate; a first conductive pattern electrically connected with the wireless communication circuit, and arranged in the first attachment member in proximity to the side surface member; and a second conductive pattern electrically connected with the wireless communication circuit, and arranged in the second attachment member in proximity to the side surface member.

According to various embodiments, the wireless communication circuit may receive signals of a same frequency band via the first conductive pattern and the second conductive pattern.

According to various embodiments, the first conductive pattern and the second conductive pattern may be formed in a same shape.

According to various embodiments, the first conductive pattern and the second conductive pattern may be spaced apart from each other to have an electric length of $2/\lambda$ or longer.

According to various embodiments, the first conductive member and the second conductive member may include metal flanges arranged in the first attachment member and the second attachment member, respectively.

Accordingly, based on the present disclosure, a portable electronic device may detect a position of at least one external electronic device (for example, an IoT device) located in proximity thereof, and may control an operation of the corresponding external electronic device based on the detected position.

The portable electronic device may include, for example, at least two antennas spaced from each other by a predetermined distance. The at least two antennas may detect the position of the corresponding external electronic device by using a phase difference between signals (for example, wireless signals) received from the external electronic device.

Accordingly, an antenna may be included in a wearable electronic device and used for detecting a position of an external electronic device. Additionally, an antenna may be manufactured to be slim (i.e., thin with respect to a width of a casing of the wearable device) by utilizing an existing component and/or an existing arrangement space.

In addition, an antenna may improve radiation performance and easily detect a position of an external electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a housing comprising a display exposed through a front surface plate, a rear surface plate facing a direction opposite the front surface plate, and a side surface member surrounding a space between the front surface plate and the rear surface plate;
   at least one attachment member coupled to the side surface member, and removably fastened to a human body, the at least one attachment member comprising a first attachment member coupled to at least part of the side surface member, and a second attachment member coupled to a position of the side surface member facing the first attachment member;
   a substrate arranged in the space in parallel with the front surface plate;
   at least one wireless communication circuit arranged on the substrate;
   a first conductive pattern electrically connected with the wireless communication circuit, and arranged on the side surface member in proximity to the first attachment member;
   a second conductive pattern electrically connected with the wireless communication circuit, and arranged on the side surface member in proximity to the second attachment member;
   a first conductive member arranged in the first attachment member a predetermined distance from the first conductive pattern to be capacitively coupled with the first conductive pattern;
   a second conductive member arranged in the second attachment member the predetermined distance from the second conductive pattern to be capacitively coupled with the second conductive pattern; and
   a processor configured to control the display to display a first object representing the electronic device, a second object representing the at least one external electronic device, and position information,
   wherein the displayed position information includes an angle, direction, or distance of the first object representing the electronic device relative to the second object representing the at least one external electronic device,
   wherein the first conductive pattern and the second conductive pattern are spaced apart from each other to have a distance of substantially $\lambda/2$ or more to prevent mutual interference, and wherein λ is a wavelength of a signal received via the first conductive pattern or the second conductive pattern.

2. The electronic device of claim 1, wherein the wireless communication circuit is configured to receive signals of a same frequency band via the first conductive pattern and the second conductive pattern.

3. The electronic device of claim 1, wherein the first conductive pattern and the second conductive pattern are formed in a same shape.

4. The electronic device of claim 1, wherein the first conductive pattern and the second conductive pattern are arranged on inner surfaces of the side surface member in the space.

5. The electronic device of claim 1, wherein the first conductive pattern and the second conductive pattern are arranged on outer surfaces of the side surface member.

6. The electronic device of claim 1, wherein the first conductive pattern and the second conductive pattern are formed by inserting at least a part thereof into the side surface member by insert injection molding.

7. The electronic device of claim 1, wherein the first conductive pattern and the second conductive pattern are attached or formed in the form of a laser direct structuring (LDS), a thin film antenna (TFA), a flexible printed circuit board (FPCB), or a steel use stainless (SUS) arranged on the side surface member of the housing.

8. The electronic device of claim 1, wherein the wireless communication circuit is configured to receive signals of a frequency band ranging from 3 gigahertz (GHz) to 10 GHz via the first conductive pattern and the second conductive pattern.

9. The electronic device of claim 1, wherein the first conductive member and the second conductive member comprise metal flanges arranged in the first attachment member and the second attachment member, respectively.

10. The electronic device of claim 9, wherein the first conductive member and the second conductive member are arranged to avoid being visually exposed when the first attachment member and the second attachment member are coupled to the housing.

11. The electronic device of claim 1,
wherein the processor is configured to calculate a position of the at least one external electronic device, based on signals received from wireless communication via the first conductive pattern and the second conductive pattern.

12. The electronic device of claim 1, wherein the electronic device comprises a wearable electronic device, which is wearable on a human body.

13. An electronic device comprising:
a housing comprising a display exposed through a front surface plate, a rear surface plate facing a direction opposite the front surface plate, and a side surface member surrounding a space between the front surface plate and the rear surface plate;
at least one attachment member coupled to the side surface member, and removably fastened to a human body, the at least one attachment member comprising a first attachment member coupled to at least part of the side surface member, and a second attachment member coupled to a position of the side surface member facing the first attachment member;
a substrate arranged in the space in parallel with the front surface plate;
at least one wireless communication circuit arranged on the substrate;
a first conductive pattern electrically connected with the wireless communication circuit, and arranged in the first attachment member in proximity to the side surface member a predetermined distance from the wireless communication circuit to be capacitively coupled with the wireless communication circuit;
a second conductive pattern electrically connected with the wireless communication circuit, and arranged in the second attachment member in proximity to the side surface member the predetermined distance from the wireless communication circuit to be capacitively coupled with the wireless communication circuit; and
a processor configured to control the display to display a first object representing the electronic device, a second object representing the at least one external electronic device, and position information,
wherein the displayed position information includes an angle, direction, or distance of the first object representing the electronic device relative to the second object representing the at least one external electronic device,
wherein the first conductive pattern and the second conductive pattern are spaced apart from each other to have a distance of substantially λ/2 or more to prevent mutual interference, and
wherein λ is a wavelength of a signal received via the first conductive pattern or the second conductive pattern.

14. The electronic device of claim 13, wherein the wireless communication circuit is configured to receive signals of a same frequency band via the first conductive pattern and the second conductive pattern.

15. The electronic device of claim 13, wherein the first conductive pattern and the second conductive pattern are formed in a same shape.

16. The electronic device of claim 13, wherein the first conductive member and the second conductive member comprise metal flanges arranged in the first attachment member and the second attachment member, respectively.

* * * * *